(12) United States Patent
Broemmelslek et al.

(10) Patent No.: US 6,768,508 B1
(45) Date of Patent: Jul. 27, 2004

(54) VIDEO NODE FOR FRAME SYNCHRONIZED MULTI-NODE VIDEO CAMERA ARRAY

(75) Inventors: Raymond M. Broemmelslek, San Diego, CA (US); Chris H. Pedersen, Jr., Santee, CA (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 539 days.

(21) Appl. No.: 09/840,700

(22) Filed: Apr. 23, 2001

(51) Int. Cl.[7] .................................................. H04N 7/18
(52) U.S. Cl. ...................................... 348/143; 348/143
(58) Field of Search ................................ 348/143, 153, 348/156, 159; H04N 7/18

(56) References Cited

U.S. PATENT DOCUMENTS

| | | | | |
|---|---|---|---|---|
| 4,037,250 A | * | 7/1977 | McGahan et al. .......... 348/159 |
| 4,831,438 A | * | 5/1989 | Bellman et al. ............ 348/148 |
| 5,867,484 A | | 2/1999 | Shaunfield ................. 370/254 |
| 5,872,594 A | * | 2/1999 | Thompson ............... 348/211.6 |
| 5,982,418 A | | 11/1999 | Ely ............................ 348/153 |
| 5,995,140 A | | 11/1999 | Cooper et al. |
| 6,049,353 A | * | 4/2000 | Gray .......................... 348/159 |
| 6,154,251 A | | 11/2000 | Taylor ....................... 348/159 |

* cited by examiner

*Primary Examiner*—Nhon Diep

(57) ABSTRACT

A number of synchronized low-cost camera nodes sharing a single cable to reduce cost associated with wiring, installation, cameras, video multiplexer and mounting is provided. Each camera node is individually addressable through a single cable to transmit an externally frame synchronized video signal onto the cable. A plurality of camera nodes can thus be wired along a single cable with each camera node individually selectable for receiving its video signal on the cable.

7 Claims, 2 Drawing Sheets

VIDEO NODE FOR FRAME SYNCHRONIZED MULTI-NODE VIDEO CAMERA ARRAY

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to video surveillance systems and more particularly to video surveillance systems using motion video camera arrays.

2. Description of the Related Art

There are several shortcomings in the current video surveillance systems that need to be overcome before complete video coverage becomes commonplace. Generally, installation and materials cost of individual video cameras is prohibitively high to permit complete video coverage of an installation or facility to be placed under surveillance. Motion video cameras used for video surveillance generally use CCD based technology, expensive lenses and enclosures. Therefore, in one solution, cameras are strategically mounted to cover thoroughfares and sensitive areas. In a retail store, for example, a fixed mount motion video camera may be placed over the main entrance, another strategically placed to cover the cash register and countertop, and another to cover expensive or easily concealed merchandise. These placements may be foiled because line-of-sight is not ideal for a particular event, or an irregular activity occurs elsewhere in the store where coverage does not exist.

In another solution, servo-controlled movable cameras are used in which line-of-sight may be remotely altered by a human operator or tracking algorithm. Movable cameras have the ability to be steered and even zoomed into an area of interest. However, each movable camera is significantly more expensive than a number of fixed mount cameras, and generally requires a human operator.

In all of the present solutions, cabling costs for each camera typically requires a power cable as well as coaxial cable for the video signals. Servo-controlled movable cameras also require cabling to support the remote camera control interface. The cabling and mounting costs may often exceed the unit cost of individual cameras.

In addition, when a number of cameras are placed, a device called a video multiplexer is typically added to the system to control and access the plurality of video signals. In current systems, a multiplexer provides cost saving benefits by allow several cameras to share the same display and/or video recording device. However, the multiplexer does not reduce the number or cost of individual camera placements.

For example, U.S. Pat. No. 5,995,140 (the '140 patent) discloses synchronization of a plurality of camera nodes from a single controller. The system disclosed in the '140 patent uses a costly approach in which unique conductors are required for each video node requiring expensive wiring and a video switcher. The '140 patent discloses the use of conventional CCD video cameras, such as the Sony model XE-75, which support external synchronization inputs and require expensive mounting hardware. Conventional external horizontal and vertical synchronization techniques are taught rather than the use of a single master frame synchronization signal driving low-cost camera chips which house digital synchronization circuitry as provided in the present invention as fully described hereinbelow.

BRIEF SUMMARY OF THE INVENTION

A number of synchronized low-cost camera nodes sharing a single cable to reduce cost associated with wiring, installation, cameras, video multiplexer and mounting is provided.

In a first aspect of the present invention, a camera node for use in a multiple camera system with a common video conductor includes a sensor for converting light to an electrical video signal. A controllable driver for driving the electrical video signal onto a video conductor is enabled by an addressable output drive controller. A communication controller receives a unique address and sets the addressable output drive controller. A synchronization signal is received for enabling the controllable driver only at the start of a video frame and disabling the controllable driver only at the completion of a video frame.

The camera node synchronization can be provided externally from the camera node. The camera node synchronization enables the controllable driver only at the start of a video field and disables the controllable driver only at the completion of a video field.

In a second aspect of the present invention, a method for using a camera node in a multiple camera system having a common video conductor includes sensing and converting light to an electrical video signal; receiving the node's unique address; synchronizing the driving only at the start of a video frame; driving the electrical video signal onto the video conductor only at the start of the next video frame; disabling the driving only at the completion of a video frame and only if a node address other than the node's unique address is received.

The method can have the synchronizing provided externally from the camera node. The method can have the synchronizing enabling the driving only at the start of a video field and disabling the driving only at the completion of a video field.

In a third aspect of the present invention, a video surveillance system using a plurality of camera nodes includes an electrical cable connected to the camera nodes, the cable including conductors for conducting power, video, control, and synchronization signals to the camera node. The camera nodes each include a sensor for converting light to an electrical video signal, a controllable driver for driving the electrical video signal onto the video signal conductor, an addressable output drive controller for enabling the controllable driver, communication controller for receiving a unique address to set the addressable output drive controller, and synchronization for enabling the controllable driver only at the start of a video frame and disabling the controllable driver only at the completion of a video frame.

Objectives, advantages, and applications of the present invention will be made apparent by the following detailed description of embodiments of the invention.

DETAILED DESCRIPTION OF THE INVENTION

Figure 1:
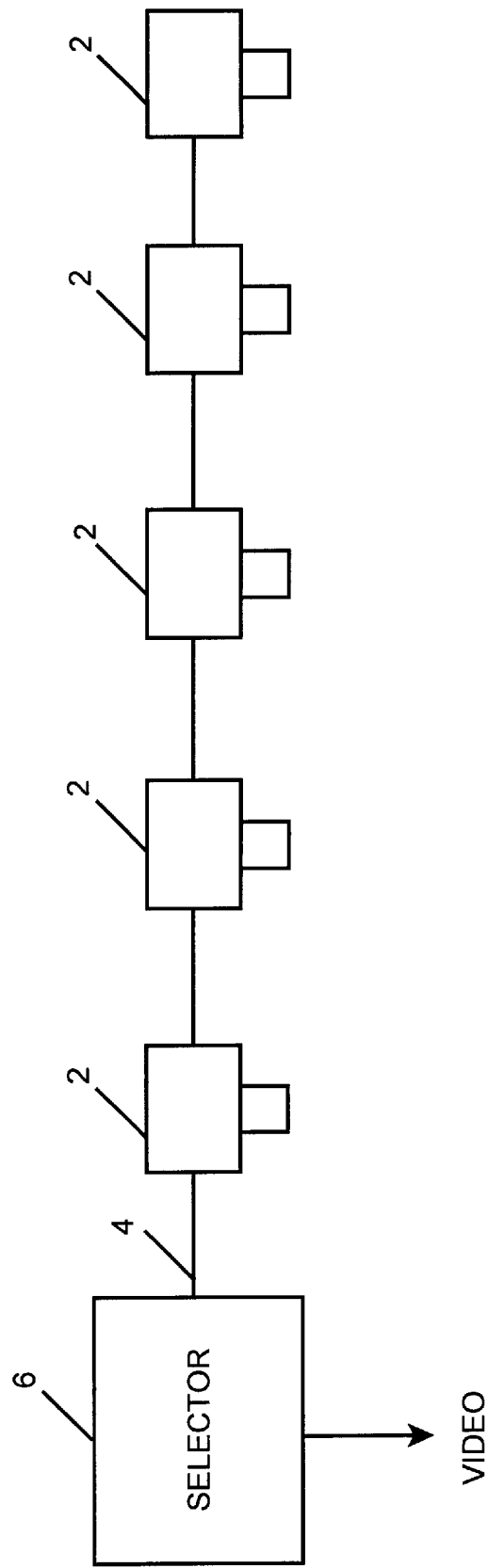
FIG. 1 is a block diagram of a multiple camera node system according to one embodiment of the present invention.

Referring to FIG. 1, the present invention integrates several simple camera nodes 2 with a single cable 4. The integration distributes the cost of the cabling over a plurality of nodes. Installing a system according to the present invention essentially only requires mounting of the cabling itself as the camera nodes 2 add an insignificant amount of additional weight to the cable, as fully described hereinbelow. Therefore, implementing the present invention can eliminate costly cameras, camera domes, and time-consuming camera mounting hardware.

The selector 6 may be any device capable of transmitting a serial stream onto the cable 4 to all camera nodes 2 in order that one camera node 2 is uniquely selected to drive its video signal onto the cable. The selector 6 may be a simple switch box and pattern generator or it may be a computer. In the best mode of the present invention described herein, the selector 6 also provides power to the camera nodes 2 through the cable 4. The selector 6 can provide video output from the currently selected camera node 2 as a pass-through of the video conductor carried within cable 4. Camera node 2 is much smaller and lighter than a commonly used video surveillance camera, and may provide a lesser quality video signal than provided by the commonly used video surveillance cameras. However, in practice, the camera node 2 typically covers comparatively less area within its field of view so that equivalent resolution may be obtained.

Figure 2:
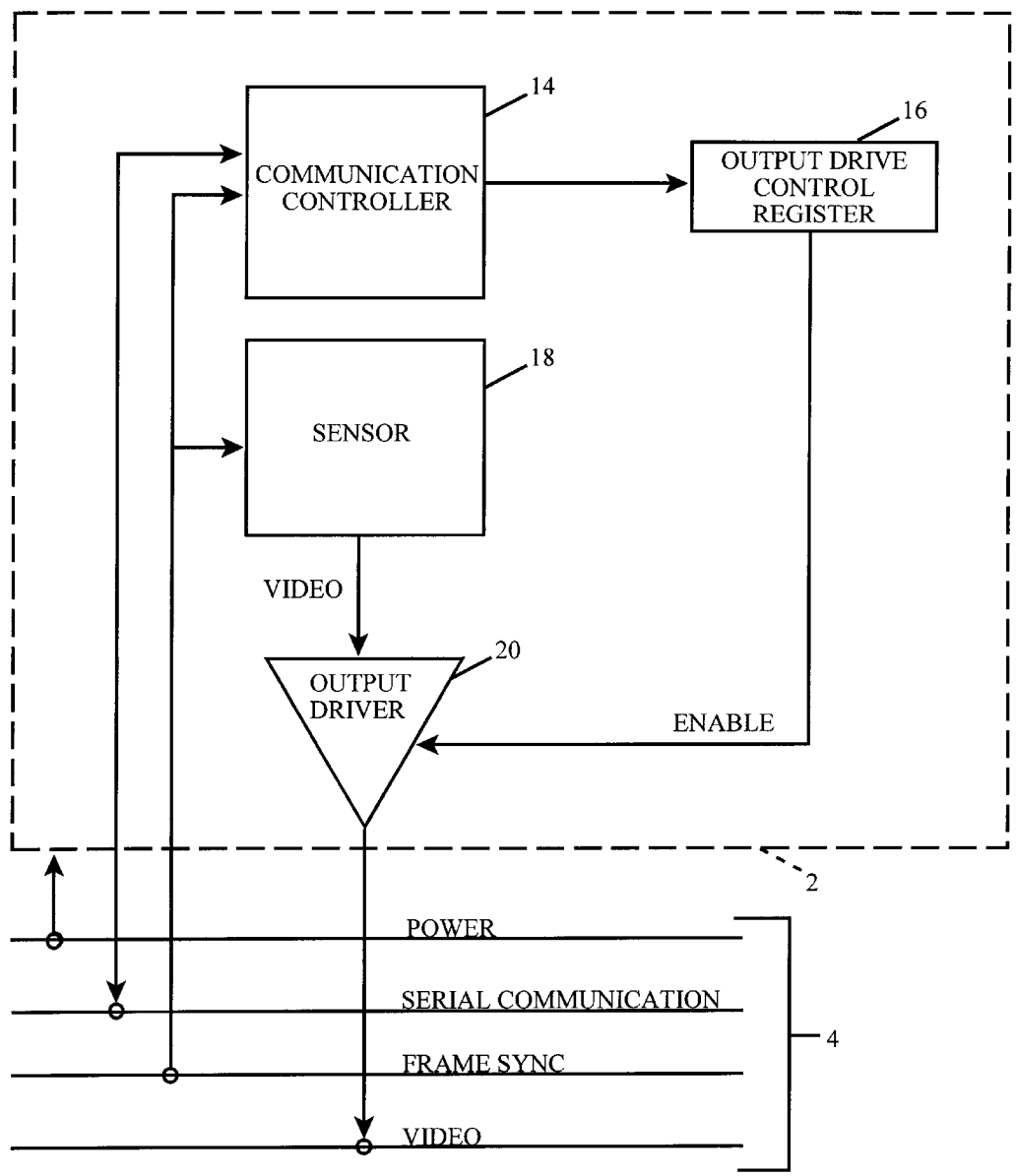
FIG. 2 is a block diagram of a camera node according to one embodiment the present invention.

Referring to FIG. 2, a detail of the camera node 2 and a section of the common wire harness 4 shared by a plurality of camera nodes 2 is illustrated. The sensor 18 receives focused light from a field of view and converts it to a video signal. This video signal is typically analog in nature and based on a format such as the NTSC or PAL standard as known in the art. Sensor 18 is much smaller and lighter than a commonly used video surveillance camera, and typically includes a light focusing lens mounted to a printed circuit board, which also contains the electronics that converts the received light to an electrical signal. Such single board cameras are known by those skilled in the art, and can be purchased as a complete unit or by individual components for self-mounting. The video signal from sensor 18 is input to the output driver 20, which buffers the video signal from driving onto the common video line of the wire harness 4 unless the camera node 2 has been enabled to do so. The sensor 18 also receives frame sync from the wire harness 4. Frame sync is shared by all camera nodes 2 from common wire harness 4 so that when one camera node 2 is switched off and another is switched on, synchronization by a receiving device such as a television monitor will not be lost. Therefore, picture tearing or rolling artifacts that are prevalent when switching between unsynchronized video signals will not appear.

The communication controller 14 is uniquely addressable from other communication controllers 14 sharing the same wire harness 4. The communication controller 14 receives a serial communication from the wire harness 4 that is sourced from a selector 6. The serial communication includes the communication controller's 14 unique address and indicates that its associated camera node 2 will be next to drive video out through the output driver 20 at the start of the next frame sync interval. The frame sync input to the communication controller 14 is used by the communication controller 14 to change the state of the output drive control register 16 at the appropriate starting point of a new frame. The state of the output control register 16 only changes at the start of a new frame interval.

If the communication controller 14 receives its unique address before the start of a new frame interval, the output control register will be set to enable the output driver 20. If the communication controller 14 receives an address other than its unique address before the start of a new frame interval, the output control register will be cleared to disable the output driver 20. Thus, the output control register 16 for all nodes 2 sharing a common wire harness 4, controls the output driver 20 so that only one video signal from the sensor 18 is driven at any one time onto the common video line.

A video frame can consist of two successive interlaced video fields. It is apparent to one skilled in the art that the synchronization described herein will apply equally to video fields and video frames.

The video signal from sensor 18 can be routed through selector 6, shown in FIG. 1, and received by a video monitor, video recorder, and the like, either locally or remotely. System interface to the power, communication, synchronization, and video conductors in cable 4 through selector 6 can be via conventional manner. Remote control of selector 6, and remote reception of the video signal can be through the Internet and/or other communication network.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. A camera node for use in a multiple camera system with a common video conductor, comprising:

a sensor for converting light to an electrical video signal;

controllable driver for driving said electrical video signal onto a video conductor;

addressable output drive controller for enabling said controllable drive means;

communication controller for receiving a unique address to set said addressable output drive control means; and, synchronization signal generator for enabling said controllable drive means only at the start of a first video field and disabling said controllable drive means only at the completion of a second video field.

2. The camera node according to claim 1, wherein said synchronization signal generator is provided externally from said camera node.

3. The camera node according to claim 1, wherein said synchronization signal generator enables said controllable driver only at the start of a first video frame and disabling said controllable driver only at the completion of a second video frame.

4. The camera node according to claim 1, wherein said synchronization signal generator enables said controllable driver only at the start of a first video frame and disables said controllable driver only at the completion of a second video frame and only if an address other than said unique address is received.

5. A method for using a camera node in a multiple camera system having a common video conductor, comprising:

sensing and converting light to an electrical video signal;

receiving a unique node address and enabling a driver for driving said electrical video signal onto a common video conductor;

generating a synchronizing signal for synchronizing said driver for driving only at the start of a video frame; and driving said electrical video signal onto the video conductor only at the start of a next video frame and disabling said driving only at the completion of a second video frame and only if a node address other than said unique node address is received.

6. The method according to claim 5, wherein said synchronizing is provided externally from the camera node.

7. A video surveillance system using a plurality of camera nodes, comprising:

an electrical cable connected to a plurality of camera nodes, said cable conducting power, video, control, and synchronization signals to said camera nodes;

each of said plurality of camera nodes including: at least one sensor for converting light to an electrical video signal, controllable driver for driving said electrical video signal onto said electrical cable, addressable output drive controller for enabling said controllable driver, communication controller for receiving a unique address to set said addressable output drive controller, synchronization signal generator for enabling said controllable driver only at the start of a first video field and disabling said controllable driver only at the completion of a second video field.

* * * * *